(12) United States Patent
Otero

(10) Patent No.: US 12,187,228 B2
(45) Date of Patent: Jan. 7, 2025

(54) RETRACTABLE STORAGE SYSTEM FOR PICKUP TRUCKS OR SIMILAR VEHICLES

(71) Applicant: Juan Antonio Otero, Pcia. de Buenos Aires (AR)

(72) Inventor: Juan Antonio Otero, Pcia. de Buenos Aires (AR)

(*) Notice: Subject to any disclaimer, the term of this patent is extended or adjusted under 35 U.S.C. 154(b) by 324 days.

(21) Appl. No.: 17/872,843

(22) Filed: Jul. 25, 2022

(65) Prior Publication Data
US 2024/0025488 A1  Jan. 25, 2024

(51) Int. Cl.
*B60R 5/04* (2006.01)
*B60P 1/64* (2006.01)
*B62D 33/02* (2006.01)

(52) U.S. Cl.
CPC ............ *B60R 5/04* (2013.01); *B60P 1/6427* (2013.01); *B62D 33/0207* (2013.01)

(58) Field of Classification Search
CPC ....... B62D 33/0207; B60R 5/04; B60R 5/041; B60R 9/06; B60P 1/6427; B60J 7/1607
USPC ........................................................ 296/37.6
See application file for complete search history.

(56) References Cited

U.S. PATENT DOCUMENTS

| | | | | | |
|---|---|---|---|---|---|
| 4,573,731 | A | * | 3/1986 | Knaack | B60R 11/06 224/404 |
| 4,830,242 | A | * | 5/1989 | Painter | B60P 3/32 224/42.32 |
| 5,685,593 | A | * | 11/1997 | O'Connor | B60R 13/01 224/404 |
| 5,934,725 | A | * | 8/1999 | Bowers | B60P 3/40 414/522 |
| 5,988,722 | A | * | 11/1999 | Parri | B60P 1/003 224/403 |
| 5,996,868 | A | * | 12/1999 | Paradis | B60R 9/00 224/539 |
| D426,187 | S | * | 6/2000 | Shultz | D12/414.1 |
| 6,283,526 | B1 | * | 9/2001 | Keough | B60P 1/003 296/183.1 |
| 6,318,781 | B1 | * | 11/2001 | Mc Kee | B60R 9/00 296/37.6 |
| 6,328,365 | B1 | * | 12/2001 | Adsit | B60R 11/06 296/37.16 |
| 6,634,691 | B2 | * | 10/2003 | Henderson | B60J 7/141 296/100.06 |
| 7,083,219 | B1 | * | 8/2006 | Gregory | B60P 1/003 414/522 |
| 7,178,848 | B1 | * | 2/2007 | Mather | B60P 1/003 296/3 |
| 7,419,203 | B2 | * | 9/2008 | Chandler | B60P 3/14 296/37.6 |
| 7,455,489 | B1 | * | 11/2008 | Klev | B60P 3/42 410/3 |

(Continued)

*Primary Examiner* — Jason S Morrow
(74) *Attorney, Agent, or Firm* — Eugenio J. Torres-Oyola; Víctor M. Rodríguez-Reyes; Rafael Rodriguez-Muriel

(57) ABSTRACT

A retractable storage system for pickup trucks that includes at least one drawer, one or more wheels, a deck adapted to cover the cargo area of a pickup truck, at least one main rail; one or more auxiliary rails; one or more fixing brackets attached to the opposing first and second walls of the cargo area that are configured to provide support to the deck, in which the at least one drawer is suspended from the at least one main rail and the one or more auxiliary rails.

14 Claims, 6 Drawing Sheets

(56) References Cited

U.S. PATENT DOCUMENTS

| | | | | |
|---|---|---|---|---|
| 7,726,719 B1* | 6/2010 | Barron | ............... | B60R 9/065 |
| | | | | 224/404 |
| 8,162,190 B2* | 4/2012 | Hanson | ............... | B60R 9/00 |
| | | | | 224/404 |
| 8,925,777 B1* | 1/2015 | Casucci | ............... | B60R 9/065 |
| | | | | 224/404 |
| 9,016,750 B2* | 4/2015 | Izydorek | ............... | B60R 9/055 |
| | | | | 296/37.6 |
| 10,098,314 B2* | 10/2018 | Murray | ............... | A01K 1/0272 |
| 10,104,864 B2* | 10/2018 | Murray | ............... | A01K 1/035 |
| 10,464,492 B1* | 11/2019 | Linn | ............... | B60J 7/102 |
| 10,632,934 B2* | 4/2020 | Linn | ............... | B60J 7/102 |
| 10,668,870 B2* | 6/2020 | Furniss | ............... | B60R 11/06 |
| 10,988,087 B2* | 4/2021 | Smith | ............... | B60R 11/06 |
| 11,634,185 B2* | 4/2023 | Peters | ............... | B62D 33/0207 |
| | | | | 296/37.6 |
| 2004/0050890 A1* | 3/2004 | Johnson | ............... | A63B 55/61 |
| | | | | 224/404 |
| 2006/0249970 A1* | 11/2006 | Lovell | ............... | B60R 9/065 |
| | | | | 296/37.6 |
| 2007/0158968 A1* | 7/2007 | Chandler | ............... | B60P 3/14 |
| | | | | 296/37.6 |
| 2007/0209556 A1* | 9/2007 | Beal | ............... | B60R 5/04 |
| | | | | 108/44 |
| 2012/0080901 A1* | 4/2012 | Izydorek | ............... | B60R 9/055 |
| | | | | 296/37.6 |
| 2013/0270854 A1* | 10/2013 | Weller | ............... | B62D 33/042 |
| | | | | 296/37.6 |
| 2023/0024026 A1* | 1/2023 | Gill | ............... | B60R 9/065 |
| 2024/0025488 A1* | 1/2024 | Otero | ............... | B60R 5/04 |
| 2024/0190356 A1* | 6/2024 | Wilson | ............... | B60R 9/10 |
| 2024/0260751 A1* | 8/2024 | Lukito | ............... | E05D 15/0643 |

* cited by examiner

RETRACTABLE STORAGE SYSTEM FOR PICKUP TRUCKS OR SIMILAR VEHICLES

FIELD OF THE DISCLOSURE

The present disclosure relates to a retractable storage compartment system configured to be installed in vehicles such as pickup trucks or the like.

BACKGROUND OF THE DISCLOSURE

Currently there are several solutions for the optimization of cargo spaces in, for example, pickup trucks and similar vehicles. The best known are perhaps those drawer and rack storage systems that are installed in the boxes of pickup trucks. These systems include drawers that are installed on a frame which is fixed by bolts to the truck bed. These storage systems impede the optimal use of the entire cargo volume that these vehicles comprise, by leaving empty spaces that are inaccessible to the user, which in the event that materials fall into said spaces, their recovery becomes almost impossible.

Furthermore, these storage systems are complex to install and always have the drawback that if their assembly and installation is designed to support heavy cargo, the weight of the system itself adds unnecessary weight to the vehicle. Such weight changes may cause the vehicle to not respond as intended during use. On the other hand, if the storage system is designed so that it does not increase the weight of the vehicle where it is installed, it does not allow the loading of heavy elements, limiting greatly the use of the vehicle.

Moreover, these storage systems typically rely on a plurality of wheels or rollers located within the housing of the drawers that permit a user to slide the drawer in and out of the truck bed. These wheels or rollers can be difficult to replace or clean due to their position within the housing of these storage systems.

Accordingly, there is a need for a storage system for pickup trucks that is easy to install and allows for the easy cleaning and replacement/repairing of wheels.

SUMMARY OF THE DISCLOSURE

The subject disclosure relates to a retractable storage system for pickup trucks, comprising: at least one drawer; one or more wheels; a deck adapted to cover a cargo area for a pickup truck; wherein the cargo area is framed by a truck bed, a front wall, a rear tailgate, and first and second opposing walls extending upright from the truck bed; at least one main rail; one or more auxiliary rails; one or more fixing brackets configured to provide support to the deck and attached to the opposing first and second walls of the cargo area; wherein the at least one drawer comprises a base with first and second sidewalls and two end walls extending perpendicularly from the perimeter of the base; wherein a first and a second wheel of the one or more wheels are attached to an upper portion of the first sidewall of the at least one drawer, and a third and a fourth wheel of the one or more wheels are attached to an upper portion of the second sidewall of the at least one drawer; wherein the deck includes a front and rear end opposite to each other, a first and second side opposite to each other and connecting the front and rear end to each other, and a first face facing away from the truck bed and a second face facing towards the truck bed; wherein the at least one main rail is attached to a middle portion of the second face of the deck; wherein a first auxiliary rail of the one or more auxiliary rails is adjacent to the first side of the deck, and the second auxiliary rail of the one or more auxiliary rails is adjacent to the second side of the deck; wherein the main rail includes a first channel and a second channel parallel to each other and configured to receive the one or more wheels; and wherein the first auxiliary rail includes a third channel configured to receive the one or more wheels, and the second auxiliary rail includes a fourth channel configured to receive the one or more wheels.

DETAILED DESCRIPTION OF THE DISCLOSURE

While the subject disclosure will be described and disclosed here in connection with certain preferred embodiments, the description is not intended to limit the disclosure to the specific embodiments shown and described here, but rather the disclosure is intended to cover all alternative embodiments and modifications that fall within the spirit and scope of the disclosure as defined by the claims included herein as well as any equivalents of the disclosed and claimed invention.

Figure 1:
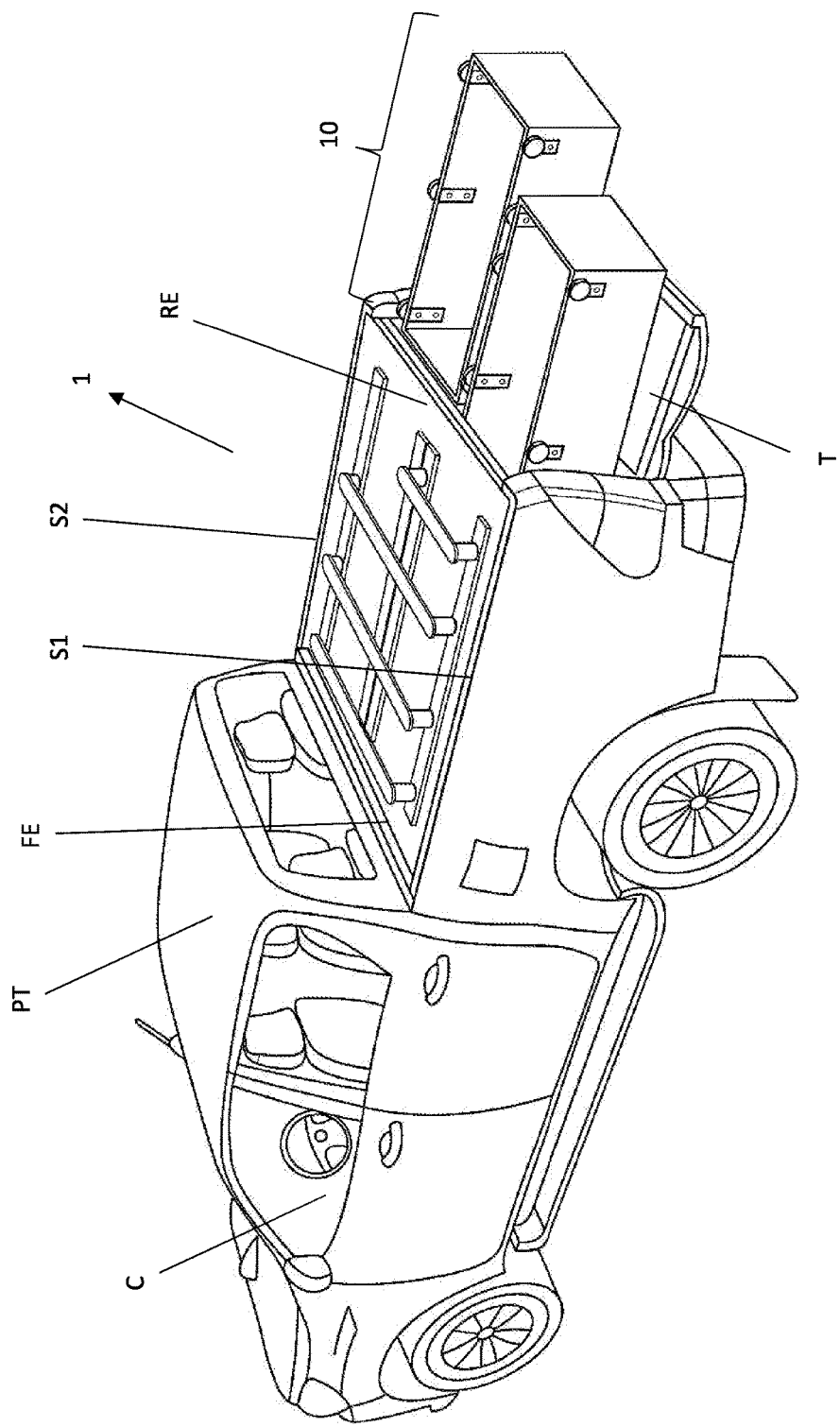
FIG. 1 shows a retractable storage system for pickup trucks.
Figure 3:
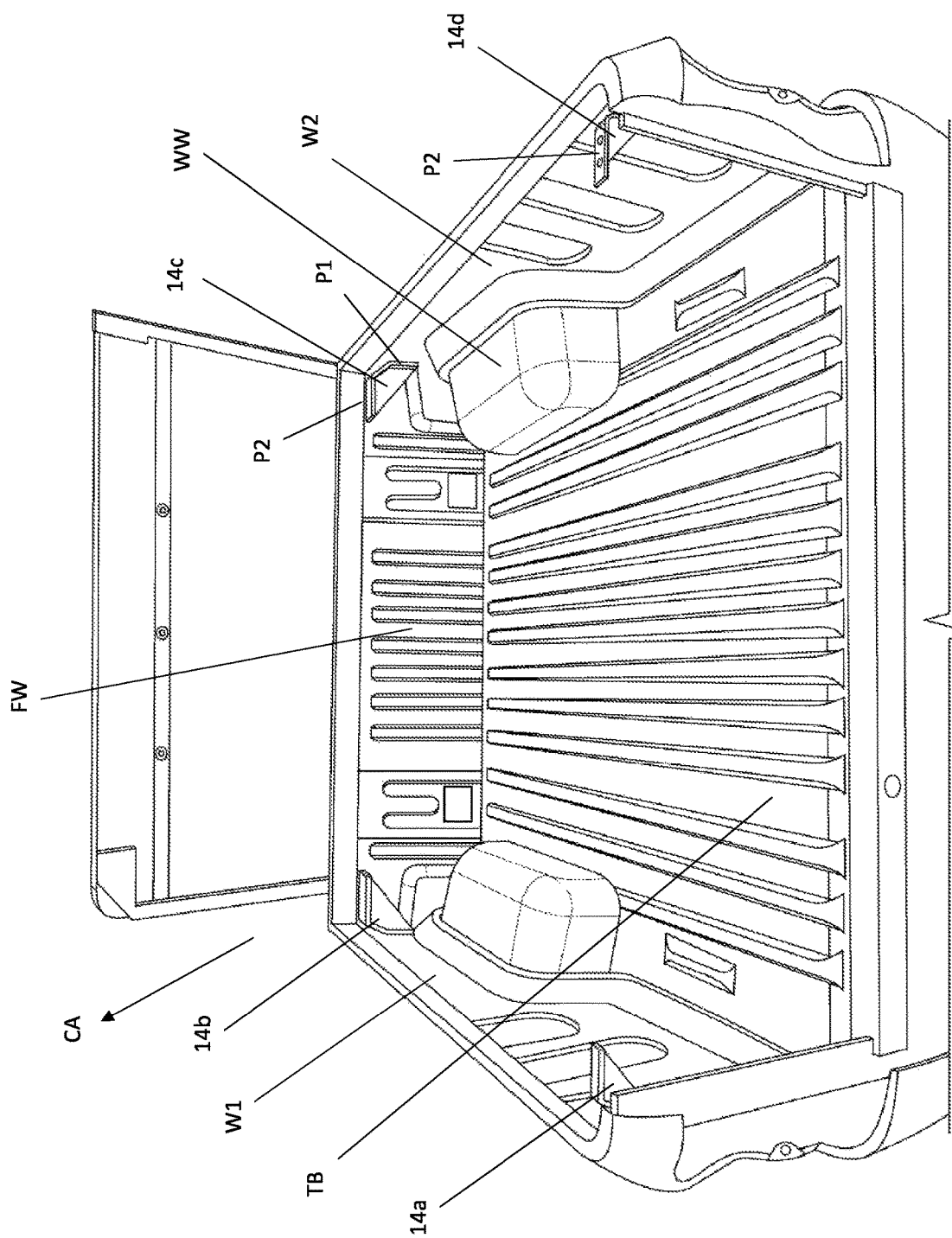
FIG. 3 shows the fixing brackets of the retractable storage system for pickup trucks.
Figure 4:
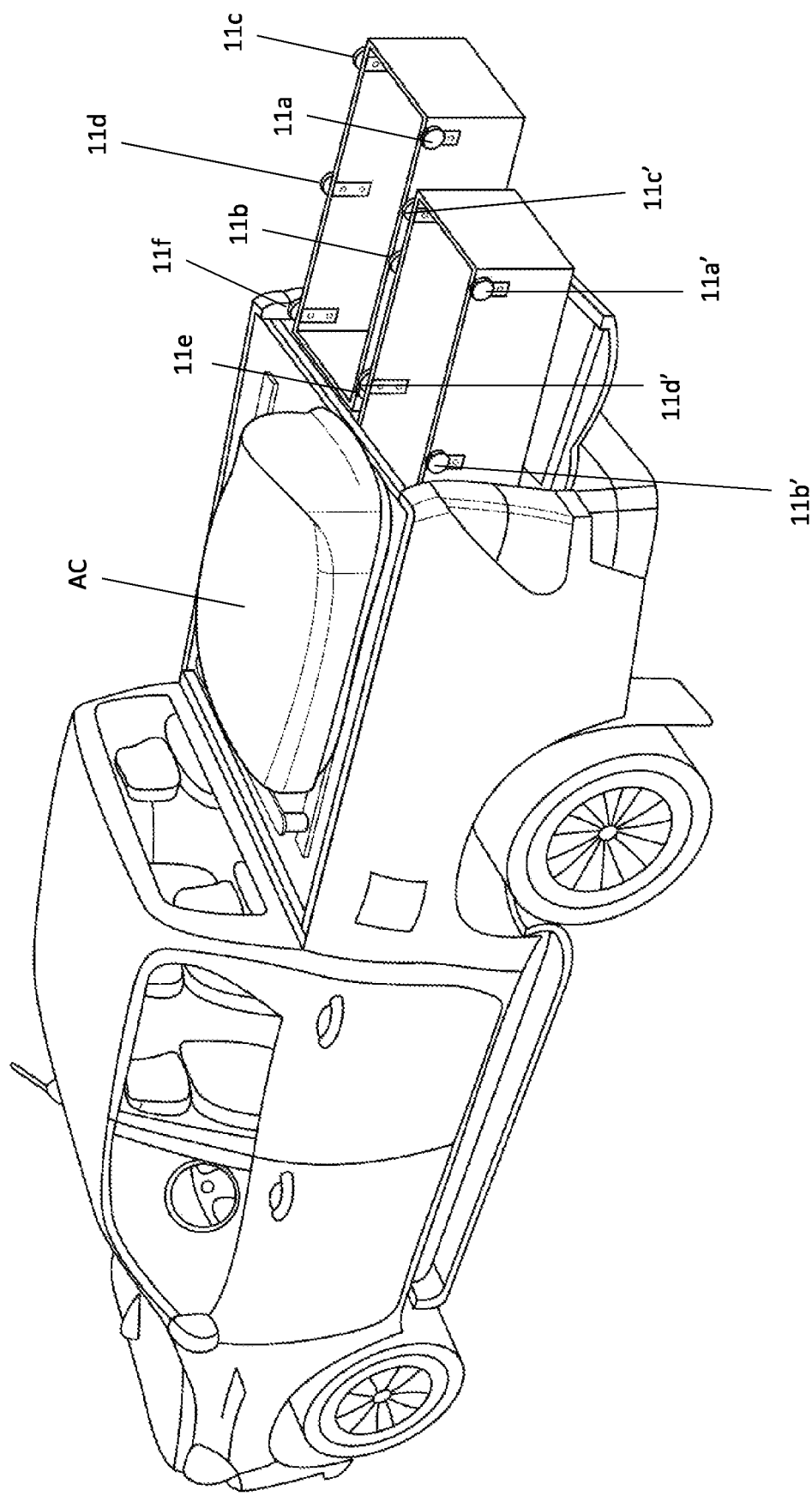
FIG. 4 shows cargo installed on the deck component of the retractable storage system for pickup trucks.
Figure 5:
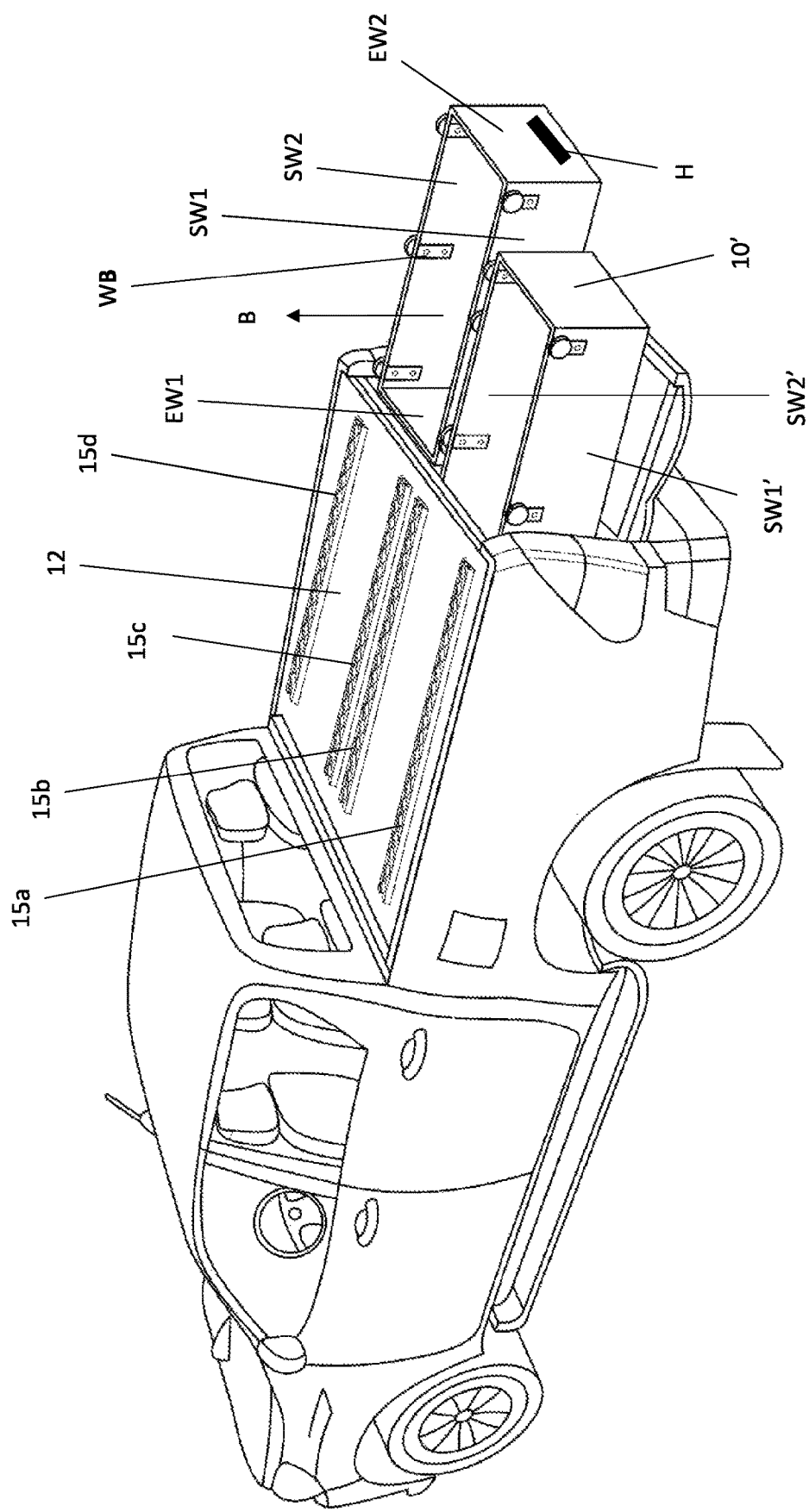
FIG. 5 shows the retractable storage system for pickup trucks without any cargo on top of the deck component.

A conventional pickup truck PT generally comprises a cab C and a cargo area CA extending immediately behind the cab C, as shown in FIGS. 1 and 3. The cargo area CA is framed by a relatively flat, rectangular truck bed TB, a front wall FW, a rear tailgate T, and first and second opposing walls W1, W2 extending upright from the truck bed TB. The tailgate T is hinged for downward swingable movement relative to the rear end of the truck bed TB. The subject disclosure relates to a retractable storage system 1 for pickup trucks or similar vehicles that is configured to be installed on the cargo area CA of a pickup truck PT, as further described below.

As shown in FIGS. 1-6, the retractable storage system 1 comprises at least one drawer 10, one or more wheels or rollers 11a-11d attached to the drawer 10, a lid or deck 12 adapted to cover the cargo area CA, at least one main rail 13a, one or more auxiliary rails 13b-c, wherein the main and auxiliary rails include one or more channels configured to receive or accommodate the wheels or rollers 11a-11d on the drawer 10; and one or more fixing brackets 14a-14d fixed or attached to the opposite walls W1, W2 of the cargo area CA, that are configured to provide support to the deck 12. The at least one drawer 10, in turn, comprises a base B with two sidewalls SW1, SW2 and two end walls EW1, EW2 extending perpendicularly from the perimeter of the base B. This configuration creates a space within the drawer 10 that can be used for storage. The at least one drawer 10 may also comprise at least one handle H to facilitate the opening or closing of the drawer 10 by pulling or pushing the drawer. The handle H should preferably be installed on the end wall EW2, which is the wall of the drawer 10 nearest to or facing the tailgate T of the pickup truck PT.

The material of the wheels or rollers 11a-11d should preferably be plastic, but other material with similar properties may also be used. The material of the deck 12, on the other hand, should preferably be TRANSONITE®, which is a lightweight, high strength, extremely durable composite panel with thermal insulation properties, but other material with similar properties may also be used. The at least one drawer 10 may be thermoformed, prepared from injected or rotational molded plastic, or manufactured from stainless steel, or any material with similar properties to any of the foregoing. Lastly, the at least one main rail 13a, one or more auxiliary rails 13b-c, should preferably be manufactured from steel, but any other material with similar properties could be used. Regarding measurements, the at least one drawer 10 should preferably measure 1450 mm in length× 350 mm in height×500 mm in width. The main rail 13a, one or more auxiliary rails 13b-c, should preferably measure 1400 mm; and the deck 12 should preferably measure 1500 mm×1500 mm.

Regarding the positioning of the one or more fixing brackets 14a-14d on the cargo area CA, it should be noted that a first fixing bracket 14a is fastened or attached, via one or more screws, to a first end of the first opposite wall W1; a second fixing bracket 14b, in turn, is fastened or attached, via one or more screws, to a second end of the first opposite wall W1, as shown in FIG. 3. Similarly, a third bracket 14c is fastened or attached, via one or more screws, to a first end of the second opposite wall W2, and a fourth bracket 14d is fastened or attached, via one or more screws S1, to a second end of the second opposite wall W2, as also shown in FIG. 3. When installed on the corresponding wall W1, W2, the brackets 14a-14d have an inverted L-shaped configuration. In other words, each bracket 14a-14d comprises 1) a first portion P1 that includes one or more openings configured to receive the one or more screws that are used to fasten the corresponding bracket 14a-14d to the corresponding wall W1, W2; and 2) a second portion P2 that extends perpendicularly from the first portion P1, that is adapted to serve as a support or base for the deck 12 to rest on. The second portion P2 includes one or more openings configured to receive one or more screws that are used to fasten (or snap into place) the deck 12 to the second portion P2 of the corresponding bracket 14a-14d.

Figure 6:
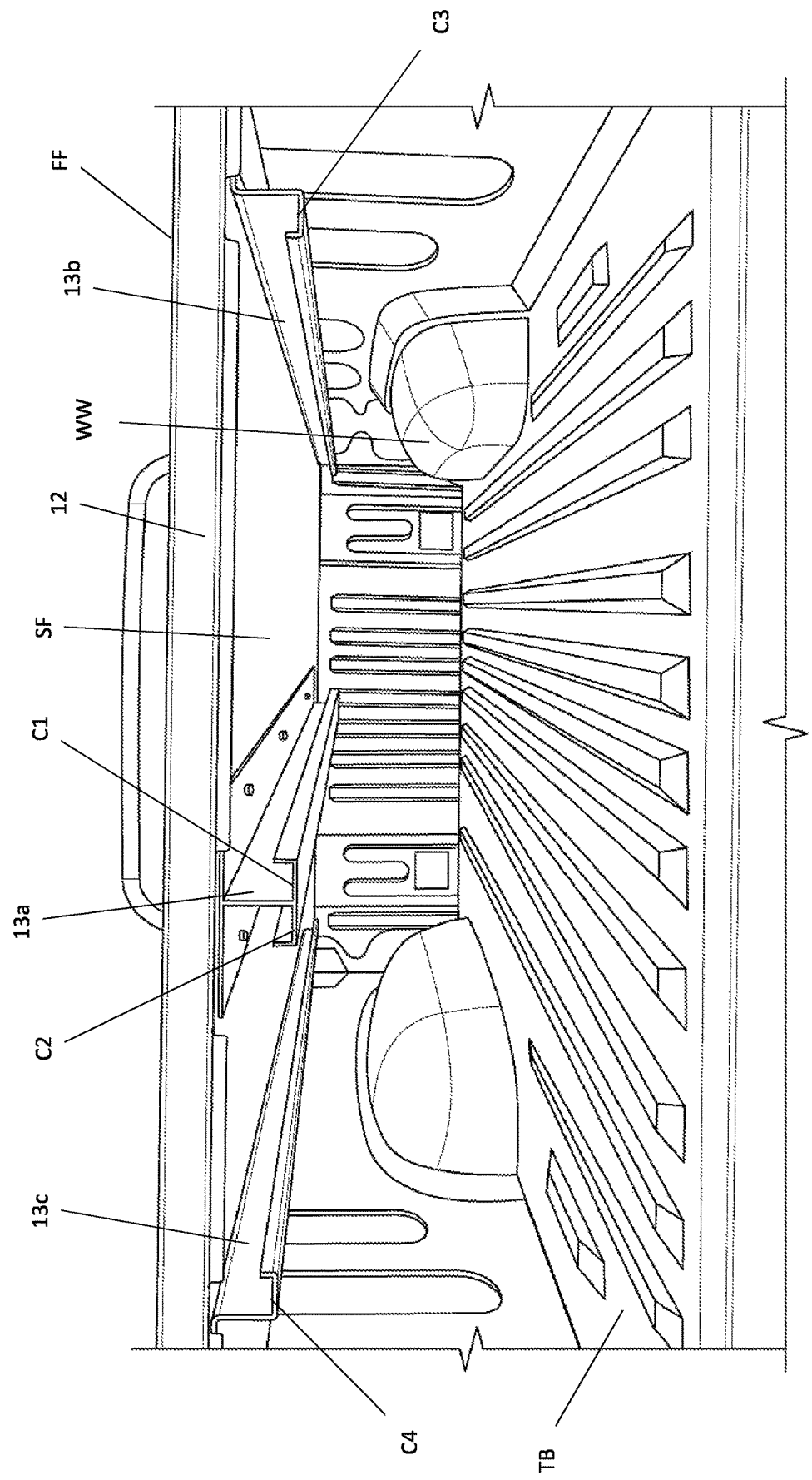
FIG. 6 shows the main rail and auxiliary rails installed under the deck component of the retractable storage system for pickup trucks.

As shown in FIGS. 1 and 6, the deck 12 includes a front and rear end FE, RE opposite to each other; a first and second side S1, S2 opposite to each other and connecting the front and rear end FE, RE to each other; a first face or portion FF facing away from the truck bed TB of the pickup truck PT; and a second face or portion SF facing towards the truck bed TB of the pickup truck PT. The first face or portion FF of the deck 12 may include one or more upper rails 15a-d adapted to affix accessories such as luggage, tools, cargo, racks, storage, bulky items, or the like AC. The upper rails 15 should preferably measure 1300 mm; and should preferably be manufactured from aluminum, but any other material with similar properties could also be used. The at least one main rail 13a, in turn, is attached or fastened to the second face or portion SF of the deck 12, preferably in the middle portion of the deck, as shown in FIG. 6. The middle portion refers to the point or position at (or about) an equal distance from the first and second sides of the deck S1, S2. This way, each drawer 10 can have the same dimensions (e.g., same size or measurements). Nevertheless, if it is desired to have drawers having different dimensions, the main rail 13a, could be placed in a position other than the middle of the deck 12. In a preferred embodiment, the main rail 13a is located in the middle the second face of the deck 12, the first auxiliary rail 13b, in turn, is adjacent to the first side S1 of the deck 12, and the second auxiliary rail 13c is adjacent to the second side S2 of the deck 12. By adjacent, it is meant that the rail is near or close to the corresponding side S1, S2 but not located exactly at the corresponding side S1, S2. For example, the distance between the auxiliary rails 13b or 13c and the corresponding side S1, S2 should be sufficient to prevent the wheel wells WW of the pickup truck PT from interfering with the sliding movement of the drawer 10. Notwithstanding the foregoing, the subject disclosure contemplates an embodiment of the retractable storage system 1 that includes only one rail that comprises two parallel channels (as further described below); namely, an embodiment in which only the main rail 13a is attached to the middle of second face of the deck 12. If the pickup truck in this embodiment includes two drawers, then only the wheels on the sidewall of the first drawer that are nearest to the main rail would be installed on one of the channels of the main rail 13a; and the wheels on the sidewall of the second drawer that are nearest to the main rail would be installed on the remaining channel of the main rail 13a.

Figure 2:
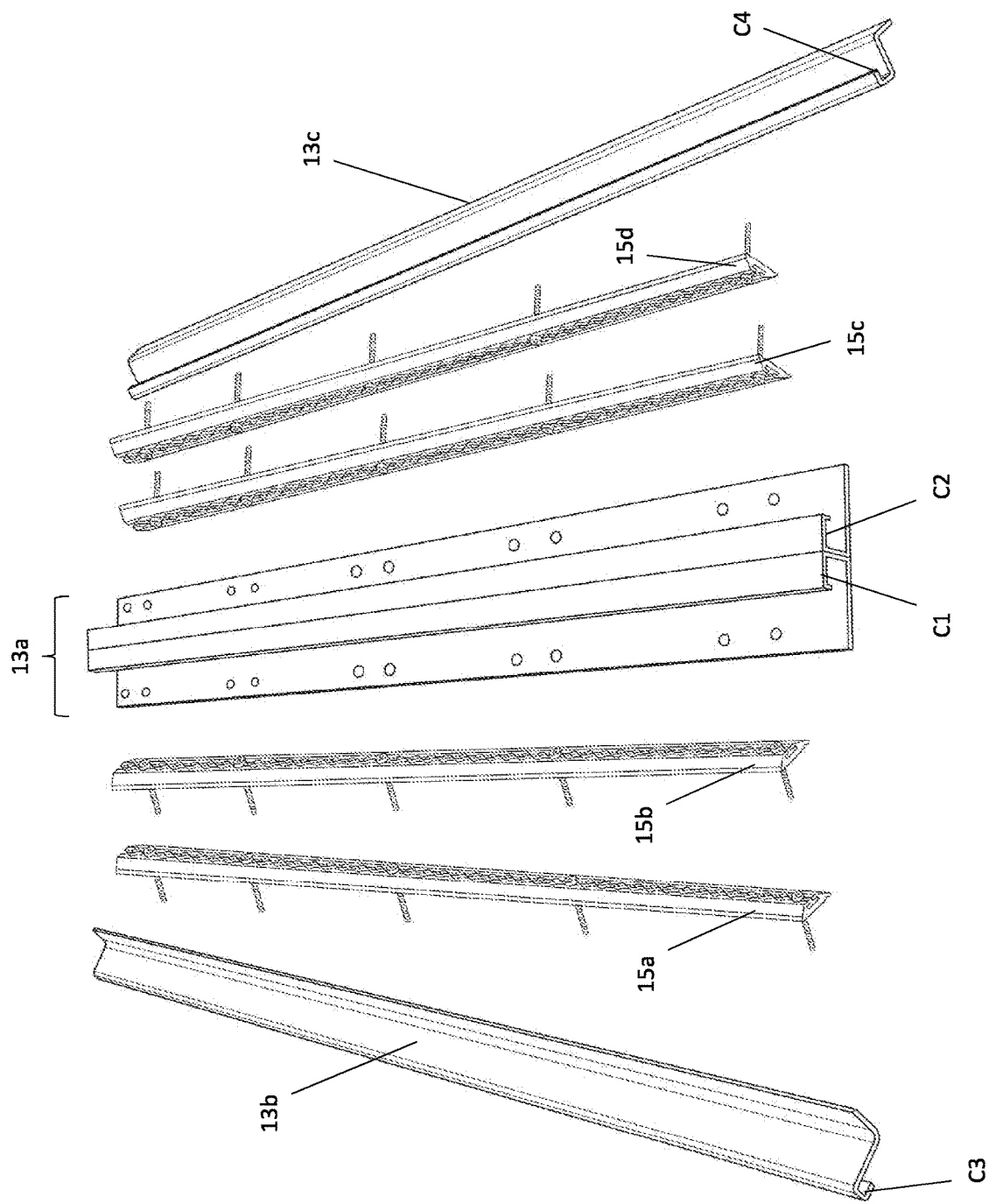
FIG. 2 shows the main rail, the auxiliary rail, and the upper rails of the retractable storage system for pickup trucks.

As previously noted, the main rail 13a and the first and second auxiliary rails 13b, 13c may include one or more channels C1-C4. As shown in FIGS. 2 and 6, the main rail 13a includes first and second channels C1 and C2, parallel to each other; the first auxiliary rail 13b includes a third channel C3, and the second auxiliary rail 13c includes a fourth channel C4. Moreover, each channel C1-C4 is configured to receive the wheels or rollers 11a-11d on the drawer 10 and to provide sliding or rolling support to the drawer 10. Each of the wheels or rollers 11a-11d, in turn, includes a base WB that is configured to be attached, via one or more screws, to an upper portion of the corresponding sidewall SW1, SW2. In a preferred embodiment, the first and second wheels or rollers 11a and 11b are attached to the first sidewall SW1; and the third and fourth wheels or rollers 11c and 11d are attached to the second sidewall SW2. In this embodiment, the first and second wheels or rollers 11a and 11b on the first sidewall SW1 engage or interact with the second channel C2; and the third and fourth wheels or rollers 11c and 11d on the second sidewall SW2 engage or interact with the third channel C3. If the same embodiment were to include a second drawer 10' (having the same or similar dimensions as drawer 10), then the first and second wheels or rollers 11a' and 11b' on the first sidewall SW1' would engage or interact with the fourth channel C4; and the third and fourth wheels or rollers 11c' and 11d' on the second sidewall SW2' would engage or interact with the first channel C1. By pulling the handle on the end wall EW2 of the drawer 10, a user can easily slide the drawer 10 in or out from the cargo area CA of the truck bed TB. In some embodiments, a fifth wheel or roller 11e may be attached to the first sidewall SW1; and a sixth wheel or roller 11f may be attached to the second sidewall SW2.

It should be noted that since the main rail 13a and auxiliary 13b, 13c rails are attached to the second face SF of the deck 12, the drawer 10 does not come into contact with the truck bed TB. In other words, since the drawer 10 is suspended from the deck 12, it prevents the truck bed TB from getting scratched or otherwise damaged. Moreover, since the wheels or ere rollers 11a-11d, are located on an upper portion of the sidewall of the drawer 10, they can be easily replaced, repaired, or cleansed. Lastly, since the deck 12 can be easily removed by unfastening the screws S2, then the cargo area CA can also be easily replaced, repaired, or cleansed. The retractable storage system 1 may also include a locking mechanism adapted to impede movement of the wheels, thereby preventing the drawer from sliding in and out of the corresponding rails.

In another embodiment, the retractable storage system 1 may include a single and larger drawer instead of two separate drawers 10, 10'. In this embodiment, the wheels or rollers 11a and 11b on the first sidewall SW1 would engage or interact with the channel C4 and the wheels or rollers 11c and 11d on the second sidewall SW2 would engage or interact with the channel C3. As such, in this embodiment the main rail 13a would not have to be present.

In view of the foregoing, the present disclosure constitutes an improvement over current similar systems in several aspects, namely:

Since the drawer is suspended instead of supported, it minimizes the loss of lower useful space.

Since the main resistance component of the system is the deck, which in turn is mechanically linked to anchor points on opposing walls of the truck bed, the system provides a space under the deck that can be locked, thus providing a safe "trunk" component.

Since the deck material has thermal insulation properties, articles stored/transported in the drawers do not suffer thermal peaks.

The joint upper and lower rails allow for multiple customized solutions that, applied to standard components, even allow their exchange and expansion in a simple way.

The high resistance of the material that makes up the deck allows maintaining a high load capacity on the upper level while maintaining the "trunk" space for storing sensitive goods.

Thus, it can be appreciated that the above-described embodiments are illustrative of just a few of the numerous variations of arrangements of the disclosed elements used to carry out the disclosure. Moreover, while the disclosure has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present disclosure, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

What is claimed is:

1. A retractable storage system for pickup trucks, comprising:
    at least one drawer;
    a plurality of wheels;
    a deck adapted to cover a cargo area for a pickup truck;
    wherein the cargo area is framed by a truck bed, a front wall, a rear tailgate, and first and second opposing walls extending upright from the truck bed
    at least one main rail;
    one or more auxiliary rails;
    one or more fixing brackets configured to provide support to the deck and attached to the opposing first and second walls of the cargo area;
    wherein the at least one drawer comprises a base with first and second sidewalls and two end walls extending perpendicularly from the perimeter of the base;
    wherein a first and a second wheel in the plurality of wheels are attached to an upper portion of the first sidewall of the at least one drawer, and a third and a fourth wheel in the plurality of wheels are attached to an upper portion of the second sidewall of the at least one drawer;
    wherein the deck includes a front end and a rear end opposite to each other, a first side and a second side opposite to each other and connecting the front and rear end to each other, and a first face facing away from the truck bed and a second face facing towards the truck bed;
    wherein the at least one main rail is attached to a middle portion of the second face of the deck;
    wherein a first auxiliary rail of the one or more auxiliary rails is adjacent to the first side of the deck, and the second auxiliary rail of the one or more auxiliary rails is adjacent to the second side of the deck;
    wherein the main rail includes a first channel and a second channel parallel to each other and configured to receive the plurality of wheels; and
    wherein the first auxiliary rail includes a third channel configured to receive the plurality of wheels, and the second auxiliary rail includes a fourth channel configured to receive the plurality of wheels.

2. The retractable storage system for pickup trucks of claim 1, wherein one of the end walls of the drawer includes a handle to facilitate the opening or closing of the at least one drawer.

3. The retractable storage system for pickup trucks of claim 1, wherein:
    a first fixing bracket is fastened or attached, via one or more screws, to a first end of the first opposite wall of the cargo area;
    a second fixing bracket is fastened or attached, via one or more screws, to a second end of the first opposite wall of the cargo area;
    a third bracket is fastened or attached, via one or more screws, to a first end of the second opposite wall of the cargo area; and
    a fourth bracket is fastened or attached, via one or more screws, to a second end of the second opposite wall.

4. The retractable storage system for pickup trucks of claim 1, wherein each fixing bracket comprises a first portion that includes one or more openings configured to receive one or more screws that are used to fasten the corresponding bracket to the corresponding wall; and a second portion that extends perpendicularly from the first portion, that is adapted to serve as a support or base for the deck to rest on.

5. The retractable storage system for pickup trucks of claim 4, wherein the second portion includes one or more openings configured to receive one or more screws that are used to fasten the deck to the second portion of the corresponding bracket.

6. The retractable storage system for pickup trucks of claim 1, wherein the first face or portion of the deck includes one or more profiles adapted to affix accessories.

7. The retractable storage system for pickup trucks of claim 1, wherein each of the wheels includes a base that is configured to be attached, via one or more screws, to an upper portion of the corresponding sidewall.

8. The retractable storage system for pickup trucks of claim 1, wherein the first and second wheels on the first sidewall of the drawer are adapted to engage with the second channel, thereby allowing the drawer to be suspended from the deck and preventing said drawer from coming into contact with the truck bed.

9. The retractable storage system for pickup trucks of claim 1, wherein the third and fourth wheels on the second sidewall of the drawer are adapted to engage with the third channel of the first auxiliary rail, thereby allowing the drawer to be suspended from the deck and preventing said drawer from coming into contact with the truck bed.

10. The retractable storage system for pickup trucks of claim 1, further comprising a at least a second drawer comprising a base with first and second sidewalls and two end walls extending perpendicularly from the perimeter of the base.

11. The retractable storage system for pickup trucks of claim 10, wherein a first and a second wheel in the plurality wheels are attached to an upper portion of the first sidewall of the at least second drawer, and a third and a fourth wheel in the plurality wheels are attached to an upper portion of the second sidewall of the at least second drawer.

12. The retractable storage system for pickup trucks of claim 11, wherein the first and second wheels on the first sidewall are adapted to engage with the fourth channel.

13. The retractable storage system for pickup trucks of claim 11, wherein the third and fourth wheels on the second sidewall are adapted to engage with the first channel.

14. The retractable storage system for pickup trucks of claim 1, wherein at least one wheel in the plurality of wheels includes a lock adapted to impede movement of the corresponding wheel.

\* \* \* \* \*